US010109876B2

(12) United States Patent
Kowlgi et al.

(10) Patent No.: US 10,109,876 B2
(45) Date of Patent: Oct. 23, 2018

(54) CARBON NANOSTRUCTURES AND NETWORKS PRODUCED BY CHEMICAL VAPOR DEPOSITION

(71) Applicant: CarbonX B.V., Amsterdam (NL)

(72) Inventors: Krishna Narayan Kumar Kowlgi, Delft (NL); Gerardus Joseph Maria Koper, Delft (NL); Rutger Alexander David Van Raalten, Delft (NL)

(73) Assignee: CARBONX B.V., Amsterdam (NL)

( * ) Notice: Subject to any disclaimer, the term of this patent is extended or adjusted under 35 U.S.C. 154(b) by 0 days.

(21) Appl. No.: 15/447,766

(22) Filed: Mar. 2, 2017

(65) Prior Publication Data

US 2017/0174518 A1  Jun. 22, 2017

Related U.S. Application Data

(63) Continuation of application No. 13/824,310, filed as application No. PCT/NL2011/050628 on Sep. 16, 2011, now Pat. No. 9,617,156.

(30) Foreign Application Priority Data

Sep. 17, 2010  (NL) .................................... 2005365

(51) Int. Cl.
*B32B 9/00* (2006.01)
*H01M 8/1004* (2016.01)
(Continued)

(52) U.S. Cl.
CPC ......... *H01M 8/1004* (2013.01); *B01J 20/205* (2013.01); *B01J 21/185* (2013.01);
(Continued)

(58) Field of Classification Search
CPC .. C01B 31/022–31/0293; Y10T 428/30; Y10S 977/742; B82Y 30/00
(Continued)

(56) References Cited

U.S. PATENT DOCUMENTS 7,144,563 B2 * 12/2006 Rao ...................... B82Y 30/00
423/447.3
2003/0042834 A1  3/2003 Dean et al.
(Continued)

FOREIGN PATENT DOCUMENTS

EP  1 334 064 B1   9/2008
EP  2 123 602 A1  11/2009
(Continued)

OTHER PUBLICATIONS

International Preliminary Report on Patentability for PCT/NL2011/050628—dated Jan. 23, 2013.
(Continued)

*Primary Examiner* — Daniel H Miller
(74) *Attorney, Agent, or Firm* — Gilberto M. Villacorta; Sunit Talapatra; Foley & Lardner LLP (57) ABSTRACT

The invention pertains to a method for manufacturing crystalline carbon nanostructures and/or a network of crystalline carbon nanostructures, comprising: (i) providing a bicontinuous micro-emulsion containing metal nanoparticles having an average particle size between 1 and 100 nm; (ii) bringing said bicontinuous micro-emulsion into contact with a substrate; and (iii) subjecting said metal nanoparticles and a gaseous carbon source to chemical vapor deposition, thus forming carbon nanostructures and/or a network of carbon nanostructures. Therewith, it is now possible to obtain crystalline carbon nanostructures networks, preferably carbon nanotubes networks.

8 Claims, 11 Drawing Sheets

(51) Int. Cl.
  B01J 21/18    (2006.01)
  B01J 23/42    (2006.01)
  B01J 35/00    (2006.01)
  B01J 37/02    (2006.01)
  B82Y 30/00    (2011.01)
  B82Y 40/00    (2011.01)
  C01B 31/02    (2006.01)
  H01M 4/92     (2006.01)
  C01B 31/00    (2006.01)
  B01J 20/20    (2006.01)
  C08K 3/04     (2006.01)
  C09C 1/44     (2006.01)
  C09K 5/14     (2006.01)
  H01B 1/04     (2006.01)
  H01M 4/90     (2006.01)
  C01B 32/00    (2017.01)
  C01B 32/15    (2017.01)
  C01B 32/16    (2017.01)
  C01B 32/162   (2017.01)
  B01J 37/16    (2006.01)
  H01M 4/96     (2006.01)

(52) U.S. Cl.
  CPC .......... *B01J 23/42* (2013.01); *B01J 35/0013* (2013.01); *B01J 37/0238* (2013.01); *B82Y 30/00* (2013.01); *B82Y 40/00* (2013.01); *C01B 31/00* (2013.01); *C01B 31/0206* (2013.01); *C01B 31/0226* (2013.01); *C01B 31/0233* (2013.01); *C01B 32/00* (2017.08); *C01B 32/15* (2017.08); *C01B 32/16* (2017.08); *C01B 32/162* (2017.08); *C08K 3/04* (2013.01); *C09C 1/44* (2013.01); *C09K 5/14* (2013.01); *H01B 1/04* (2013.01); *H01M 4/9083* (2013.01); *H01M 4/926* (2013.01); *H05K 999/99* (2013.01); *B01J 37/16* (2013.01); *C01P 2002/82* (2013.01); *H01M 4/96* (2013.01); *Y10S 977/742* (2013.01); *Y10S 977/753* (2013.01); *Y10S 977/843* (2013.01); *Y10T 428/256* (2015.01); *Y10T 428/31678* (2015.04)

(58) Field of Classification Search
  USPC .......................... 428/408; 423/448; 977/742
  See application file for complete search history.

(56) References Cited

U.S. PATENT DOCUMENTS

2003/0118727 A1* 6/2003 Ting .................. B82Y 30/00
                                              427/249.1
2003/0122111 A1 7/2003 Glatkowski
2006/0104889 A1 5/2006 Harutyunyan et al.

FOREIGN PATENT DOCUMENTS

| EP | 1 952 467 B1 | 10/2011 |
| MX | 6000105 A | 10/2008 |
| MX | 2007016100 A | 6/2009 |
| WO | WO-2010/041937 A1 | 4/2010 |

OTHER PUBLICATIONS

International Search Report for PCT/NL2011/050628—dated Dec. 23, 2011.

Takenaka, et al. "Formation of carbon nanotubes through ethylene decomposition over supported Pt catalysts and silica-coated Pt catalysts" Carbon 47, 2009, pp. 1251-1257.

* cited by examiner

CARBON NANOSTRUCTURES AND NETWORKS PRODUCED BY CHEMICAL VAPOR DEPOSITION

CROSS REFERENCE TO RELATED APPLICATIONS

This application is a Continuation of U.S. patent application Ser. No. 13/824,310, filed Jun. 3, 2013, which is the National Phase of International Application PCT/NL2011/050628, filed Sep. 16, 2011, which was published on March 22, 2012, as WO 2012/036555 A1, which claims the benefit of Netherlands Patent Application No. 2005365, filed Sep. 17, 2010. The contents of these applications are incorporated herein by reference in their entirety.

FIELD OF THE INVENTION

The present invention relates to nanostructures of carbon such as carbon nanotubes (CNTs), fullerenes and graphenes. More particularly, the invention pertains to networks of carbon nanostructures, particular CNT networks, the production thereof, and the use of such networks in composite materials. The invention also pertains to compositions suitable for use in nanostructures network production.

BACKGROUND OF THE INVENTION

Carbon nanotubes are tubular structures formed by one or more layers of graphene. Since the discovery of a synthetic process to make carbon nanotubes in the early nineties, lot of attention has been concentrated on CNTs because of their excellent electrical, thermal and mechanical properties and large specific surface. Based thereon, all kinds of applications have been suggested, ranging from microelectronic components, displays, radio communication to fuel cells.

There are three main approaches for the synthesis of single- and multi-walled carbon nanotubes, including electric arc discharge of graphite rod, laser ablation of carbon, and chemical vapor deposition of hydrocarbons. However, the most cost-effective methods for synthesizing carbon nanotubes have been based on chemical vapor deposition (CVD). Metal catalyzed thermal CVD typically uses a cheap feedstock and has relatively low energy requirements, and has therefore attracted interest for the purpose of bulk synthesis. In CVD methods, a carbon-containing gas is decomposed at high temperatures and under the influence of a finely divided catalyst (usually iron, nickel, cobalt or other transition metals or alloys) the carbon atoms are bonded to form CNTs. Catalyst particles may be manufactured in situ by the decomposition of metalloorganic compounds or may be inserted into the CVD furnace on a fixed substrate.

EP 1952467 is directed to nanowire structures and interconnected, porous nanowire networks comprising such structures. The nanowire serves as a core for a template for the growth of carbon networks. To maximize catalyst accessibility and utilization, for instance in fuel cell applications, EP'467 teaches to deposit a thin film or layer of metal catalyst onto the surface of the nanowires. However, the intimate linkages between nanowire support and the catalyst particles deposited thereon reflects on the limited catalyst efficacy and conductivity properties. Additionally, the catalyst particles located on top of the carbon structure makes those more vulnerable to desorption. Also, the nanostructures thus obtained are non-crystalline, which would render these structures less suited for many applications. The contents of EP'467 is herein incorporated by reference.

It is widely recognized in the art that CVD typically results in a large amount of impurities due to little control over catalyst properties besides other reasons. US 2006/0104889 teaches catalysts of small average particle sizes with narrow size distribution, otherwise difficult to synthesize. US'889 proposes catalyst particles having a size between 1 to 50 nm supported on a powdered oxide at a 1:1-1:50 particles to support weight ratio. The contents of US'889 is herein incorporated by reference.

EP 1334064 discloses a process for preparing carbon nanotubes, which comprises suspending nanometer-sized fine metal particles in a gaseous phase. It enables control of the shape and structure of the carbon nanotubes. The metal nanoparticles have an average size in the order of a few to several hundred nanometers. It is attempted to control CNT purity through the use of surfactant, which should prevent cohesion of the colloidal metal particles. The contents of EP'064 is herein incorporated by reference.

EP 2123602 discloses nanotubes grown using CVD process in which an S-layer of proteins is generated on a substrate and used as a mask where inorganic nanoparticles are deposited on through the incubation and and reduction of the corresponding metal salt solution. It suggests a physical assembly of discrete nanostructures in FIGS. 1a, 1b and 2, without any chemical interconnectivity between those structures. The contents of EP 2123602 is herein incorporated by reference.

However, the narrow size distributions of metal catalyst particles applied in the art such as the above can only be provided in low densities. Even if use is made of a micro-emulsion to stabilize the metal particles, metal particle concentrations are typically of about few mM, on the penalty of break-up. For that particular example in EP 1334064, the maximum concentration of metal particles is 10 mM. Hitherto, at these kinds of concentrations however networks of carbon nanostructures have not been observed in the art.

Also, regardless of the above attempts to control particle size in CVD, Takenaka et al. "*Formation of carbon nanotubes through ethylene decomposition over supported Pt catalysts and silica-coated Pt catalysts*" Carbon 47 (2009) 1251-1257, shows that an initially controlled size of metal particles is no warrant for success, because without any preventative measures the metal particles seriously aggregate during the actual carbon decomposition.

Hence, the art strives for better control of catalyst aggregation, and consequently, the purity and uniformity of the carbon nanostructures. There is also a need for simple CVD-based methods to produce chemically interconnected carbon nanostructure networks.

SUMMARY OF THE INVENTION

The inventors have found a cost-effective method for manufacturing carbon nanostructures (such as CNTs), by forming and growing nanostructures around a monodisperse distribution of nanosized metal particles. In particular a network of chemically interconnected carbon nanostructures can be synthesized by this method, which is unprecedented. The networks when used as fillers in composites impart electrical properties, mechanical strength, thermal properties and chemical resistance unprecedented in the prior art. Examples of some of these properties are given in the accompanying examples.

Use is made of technology disclosed in WO 2010/041937, outside the field of carbon nanostructures, providing a high density and narrow size distribution of controlled size metal particles, which are grown in bicontinuous micro-emulsions.

The contents of WO'937 is herein incorporated by reference. The micro-emulsion character enables good control of particle size and monodispersity. The inventors' insights render it possible to drastically reduce impurities during CVD while allowing the growth of virtually any nanostructure. Deposition of catalyst is avoided.

Key in the process of the invention is that the nanostructures are grown around the catalyst particles prepared in the bicontinuous micro-emulsion. Surprisingly, while the bicontinuous micro-emulsion character is lost in the elevated temperature CVD environment, the metal particle size is maintained, and aggregation is—unlike in the art for other stabilizing systems—less likely to occur. Although the inventors do not wish to be tied down to any theory, the reason is believed to rest in the micro-emulsion carbonizing around the particles above 770 K, thus preventing these from sintering during carbon decomposition.

Moreover, through the use of a bicontinuous micro-emulsion for manufacturing the metal particles it is possible to reach particle concentrations higher than with any other system, including droplet-type (water-in-oil, L2 phase) micro-emulsions such as disclosed in WO 81/02688. In the field, the term 'L2' is reserved for emulsions consisting of small water surfactant aggregates in a continuous oil phase. For sake of completeness, it is confirmed in the accompanying examples that the use of the L2-type micro-emulsion in for instance the CVD process of EP 2123602 does not yield any networks. It is however noted that WO'688 itself is outside the field of carbon nanotubes, and lacks any pointer to the CVD process.

Although the inventors do not wish to be tied down to any theory, it is their belief that the increased particle concentrations may be attributed to the control of the kinetics of the production precursor atoms, nucleii and subsequently the particles via the intricate nanostructure of the bicontinuous micro-emulsion. In addition, the high surfactant concentrations available in the bicontinuous micro-emulsion stabilize the huge surface created by many small particles. It is therewith possible to increase metal particle concentrations orders of magnitude over droplet type micro-emulsions. The authors hypothesize that by having a high concentration of catalyst nanoparticles several nucleation centres are created which further grow to form the branches that form the basis of the carbon nanotube network. The art is silent on such networks.

Product-wise, the carbon nanostructures and their networks thus obtained are distinguishable from those nanostructures produced according to the prior art, in terms of structure and porosity, but also in terms of their chemical, electrical and mechanical properties (such as conductivity and permittivity) which can readily be verified without undue burden by the skilled person using conventional spectroscopic techniques (e.g. dielectric spectroscopy). These properties may benefit applications such as in catalysis (e.g. heterogenous, electrocatlysis), metallurgy (e.g. anodes for aluminum production), electronics (e.q. storage devices, processors), sensors (e.g. for biomolecules, toxic ions in water) and frameworks for utility items (e.g. aircraft or automobile parts, sports goods). Details on these properties are discussed in the accompanying examples.

BRIEF DESCRIPTION OF FIGURES

FIGS. 6a and 6b show the discrepancy in shape and structure between state-of-the-art nanotubes (b) and the CNT networks (a) according to the invention.

DETAILED DESCRIPTION

According to one aspect, the invention pertains to a method for manufacturing crystalline carbon nanostructures, preferably nanotubes, comprising (i) providing a bicontinuous micro-emulsion containing metal nanoparticles having an average particle size from 1 to 100 nanometers, (ii) bringing said bicontinuous micro-emulsion into contact with a substrate and (iii) subjecting said metal nanoparticles and a gaseous carbon source to chemical vapor deposition, thus forming said crystalline carbon nanostructures.

Advantageously, the uniformity of the metal particles is controlled in said bicontinuous micro-emulsion by mixing a first bicontinuous micro-emulsion in which the aqueous phase contains a metal complex salt capable of being reduced to the ultimate metal particles, and a second bicontinuous micro-emulsion in which the aqueous phase contains a reductor capable of reducing said metal complex salt; upon mixing the metal complex is reduced, thus forming metal particles.

The controlled bicontinuous environment stabilizes the particles against sintering or Ostwald ripening. Size, concentrations and durability of the catalyst particles are readily controlled. It is considered routine experimentation to tune the average metal particle size within the above range, for instance by amending the molar ratio of metal precursor vs. the reducing agent. An increase in the relative amount of reducing agent yields smaller particles. The metal particles thus obtained are monodisperse, deviations from the average particle size are preferably within 10%, more preferably within 5%.

Also, the present technology provides no restraint on the actual metal precursor, provided it can be reduced. Unlike in the art, there is no need to subsequently deposit layers of active catalyst materials onto the metal particles thus formed. In the catalytic CVD the known effective catalyst species are the noble metals (Pt, Pd, Au, Ag), iron-family elements (Fe, Co and Ni), Ru, and Cu. Suitable metal complexes are but are not limited to (i) platinum precursors such as $H_2PtCl_6$; $H_2PtCl_6.xH_2O$; $K_2PtCl_4$; $K_2PtCl_4.xH_2O$; $Pt(NH_3)_4(NO_3)_2$; $Pt(C_5H_7O_2)_2$, (ii) ruthenium precursors such as $Ru(NO)(NO_3)_3$; $Ru(dip)_3Cl_2$ [dip=4,7-diphenyl-1,10-fenanthroline]; $RuCl_3$, or (iii) palladium precursors such as $Pd(NO_3)_2$, or (iv) nickel precursors such as $NiCl_2$ or $NiCl_2.xH_2O$; $Ni(NO_3)_2$; $Ni(NO_3)_2.xH_2O$; $Ni(CH_3COO)_2$; $Ni(CH_3COO)_2.xH_2O$; $Ni(AOT)_2$ [AOT=bis(2-ethylhexyl) sulphosuccinate].

Non-limiting suitable reducing agents are hydrogen gas, sodium boron hydride, sodium bisulphate, hydrazine or hydrazine hydrate, ethylene glycol, methanol and ethanol. Also suited are citric acid and dodecylamine.

The type of metal precursor is not an essential part of the invention, as evidenced in the accompanying examples. In one aspect, the metal of the particles of the bicontinuous micro-emulsion is selected, preferably from the group consisting of Pt, Pd, Au, Ag, Fe, Co, Ni, Ru and Cu, in order to control morphology of the carbon nanotube networks ultimately formed.

The term "carbon nanostructures" are understood to comprise crystalline sp2- based carbon allotropes, i.e. substances in which a carbon atom is bonded to neighboring three carbon atoms in a hexagonal pattern, including graphene, fullerene and carbon nanotubes. Advantageously, through the use of the bicontinuous micro-emulsions and therewith the ability to provide uniform and high metal particle concentrations, the skilled person can prepare any crystalline carbon nanostructure desired, dependent on the actual metal particle size and density applied.

Carbon nanotubes are the preferred nanostructure, i.e. cylindrical carbon molecules having a diameter ranging from several angstroms to several nanometers, with the length ranging from ten-folds to thousand-folds of the diameter. With the present invention it is possible to produce both single-walled and multi-walled (e.g. double-walled) CNTs, referring to the number of carbon layers making up to the wall of the nanotube.

The method of the invention allows for the growth of crystalline carbon nanostructure networks of multiple carbon nanostructures, which are chemically interconnected, through all kinds of junctions, including Y- and H-junctions (see FIGS. 7a-7d).

The reaction processes of the present invention to form carbon nanotubes using chemical vapor deposition are described in the prior art. Therefore, without being particularly limited in the present invention, the process parameters for carrying out the present invention, such as the temperature, time and pressure, may be readily determined by a person having ordinary skill in the art from the prior art. Merely as a guideline, the reaction conditions in step (iii) of using the active metal catalyst, which is deposited on a support or carrier, to catalyze a carbon accumulation reaction for forming carbon nanotubes include: introducing an inert gas (e.g. He, Ar or $N_2$), hydrogen and a carbon source gas into a reactor at a high temperature and a pressure of 1-5 bars for a reaction time of 1-360 minutes. The high temperature environment ranges from 750 to 1100 K, preferably 800 K or higher, more preferably at least 850 K, particularly at least 900 K. Upon completion of the reactions, the support is removed in order to recover carbon nanotubes.

The process is preferably a batch process, wherein the carbon-containing gas and metallic catalytic particles are disposed within the reactor cell and held therein for the duration of the reaction period. Alternatively, the process may be continuous, wherein the metallic catalytic particles and carbon-containing gas are continuously fed and mixed within the reactor.

The gaseous carbon source includes aliphatic hydrocarbons, both saturated and unsaturated, such as methane, ethane, propane, butane, hexane, ethylene, acetylene and propylene; carbon monoxide, oxygenated hydrocarbons such as acetone and methanol; aromatic hydrocarbons such as toluene, benzene and naphthalene; and mixtures of the above, for example carbon monoxide and methane. Use of acetylene promotes formation of multi-walled carbon nanotubes, while CO and methane are preferred gases for formation of single-walled carbon nanotubes. The gaseous carbon source may optionally be mixed with a diluents gas such as nitrogen, helium, argon or hydrogen.

The support is selected such that it will not react with the active metal catalyst inadvertently during a heating process, so that the active metal catalyst can catalyze a synthesis reaction of the carbon nanotubes as desired. The support is preferably selected from titanium, copper, stainless steel, molybdenum and inert oxides such as silica (glass, quartz), ceramics and exotic materials such as diamond. Excellent structures are obtained with zeolite for support. With the bicontinuous emulsion-based metal catalyst particles, the type of support did not have any detrimental effect on the grown nanostructures.

As a result of the process according to the invention, uniform crystalline nanostructures are obtained in which the metal nanoparticles are embedded inside and physically attached to the carbon nanostructures, which form and grow around these particles. Upon analysis it is found that metal aggregation during CVD is minimal, the singular character is maintained.

In one aspect, the invention pertains to networks of chemically linked, i.e. covalently linked, carbon nanostructures, preferably CNTs, obtained or obtainable by the method as detailed above. The minimum concentration of metal particles at which networks are formed depends on a range of parameters all readily controlled by the skilled person. Although the density of metal particles is a pronounced factor, other contributing parameters are the type of bicontinuous emulsion including its organic phase and surfactant, and their relative amounts. Examples are provided in the accompanying examples. It is considered within the skilled person's ambits to provide a metal particles density sufficient to enable network formation, the use of bicontinuous emulsions advantageously puts no restraints to this process.

In order to arrive at nanostructures networks, it is however preferred to subject metal particles in a bicontinuous micro-emulsion to the CVD process in an active metal concentration of at least 15 mM, more preferably at least 20 mM, particularly at least 25 mM, especially 30 mM. Excellent networks are obtained at concentrations higher than 40 mM.

Figure 3A:
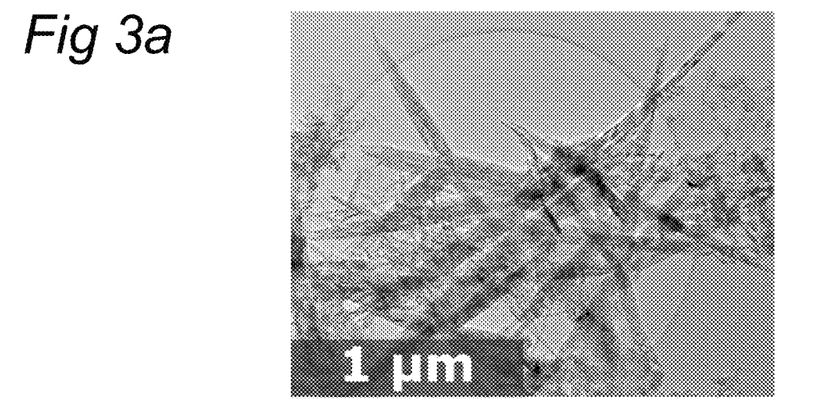
FIG. 3a shows a transmission electron microscopy image of a carbon nanotubes networks. The thicker and longer structures are clusters of smaller nanotubes.
Figure 3B:
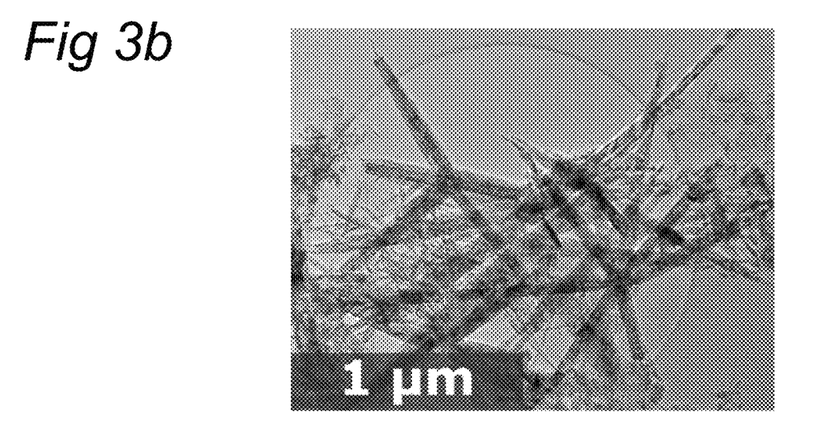
FIG. 3b highlights on the nodes where the carbon nanotubes network with illustrated overlays.
Figure 4:
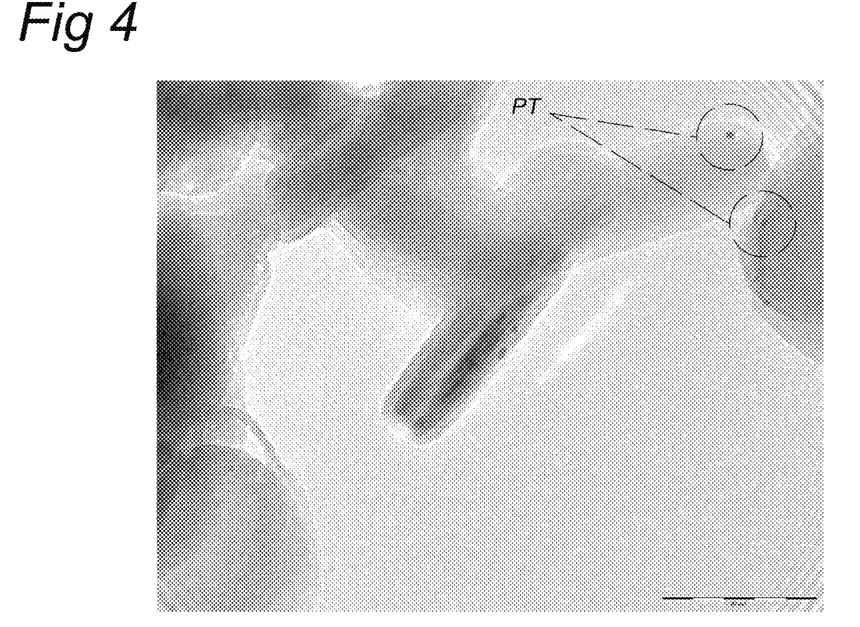
FIG. 4 shows that the nanotubes are chemically interconnected. The black spots are nanoparticles catalysts that were used to grow the tubes.
Figure 5:
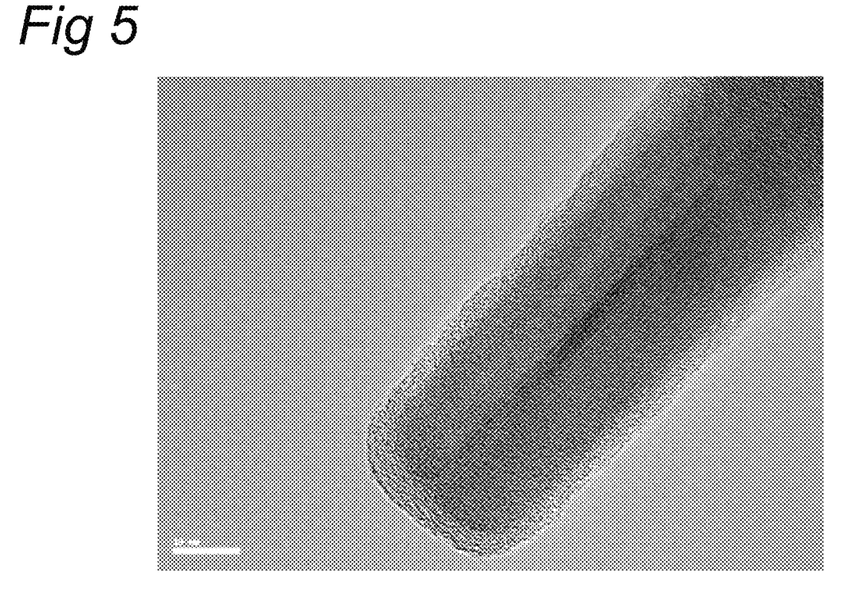
FIG. 5 shows a multi-walled carbon nanotube having a capped end. The lighter sheath around a dark core of the nanotubes could be due to an amorphous layer or due to aberration because of the curvature of the nanotube.

These are concentrations of the catalyst relative to the amount of the aqueous phase in the bicontinuous micro-emulsion. At high catalyst particle densities carbon nanotube networks are obtained in which the carbon nanotubes are chemically linked (FIGS. 3a and 3b). These relative amounts are preferably based on the sum of contributing metal particles. In this aspect, the carbon nanostructures thus formed are distinguished from the prior art.

Figure 10A:
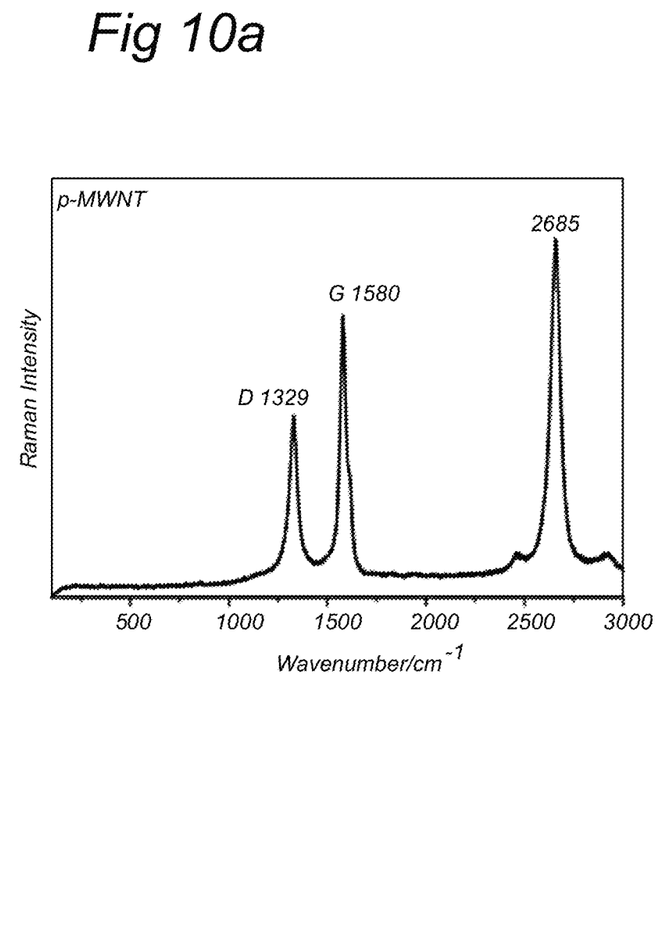
FIGS. 10a and 10b compares the Raman spectrum of (a) multi-walled carbon nanotubes and (b) CNT networks.
Figure 10B:
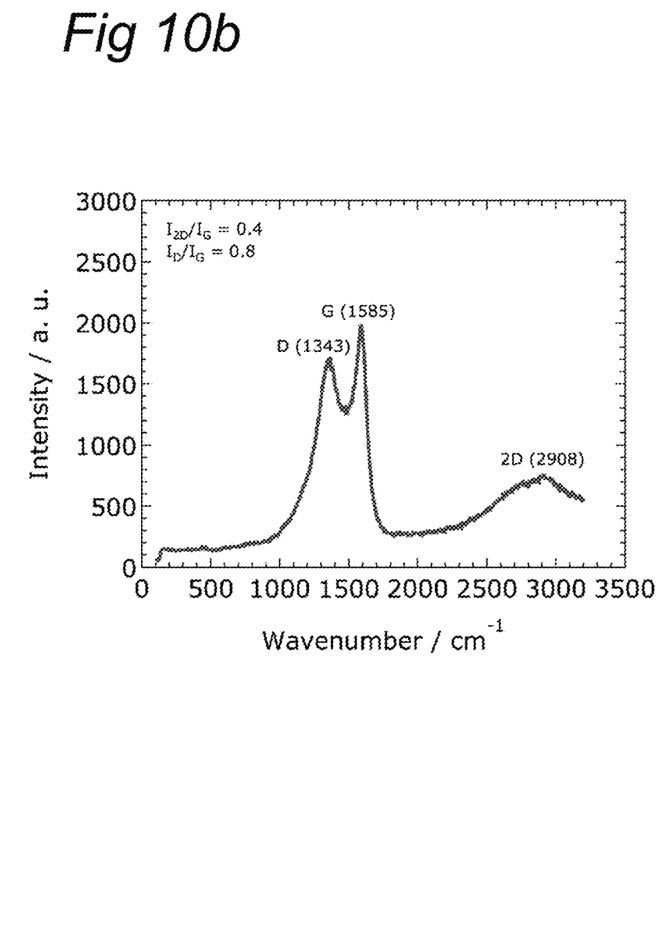

This is also reflected in the properties of the carbon nanostructure networks, which do not correspond to the behavior found for non-carbon networks. The carbon nanostructures in the prior art, which are not chemically connected, show completely different behavior. According to one embodiment, these networks may be characterized by Raman spectroscopy, exhibiting two partly overlapping signals (but yet distinguishable) in the wavelength region of 1000-2000 $cm^{-1}$, and a broad third signal in the wavelength region of 1800-3500 $cm^{-1}$; a signal is typically identified by having a signal-to-noise ratio of at least 5, more preferably at least 10, more preferably at least 20. The broad signal may be characterized having a signal width at half-height of at least 100 $cm^{-1}$, preferably 100-800 $cm^{-1}$, more preferably 100-400 $cm^{-1}$. In one embodiment, the signal width at half-height is at least 300 $cm^{-1}$, preferably up to 1000 $cm^{-1}$. An example of the distinction between CNTs and CNT networks is shown in FIGS. 10a and 10b.

Additionally or alternatively, according to embodiments of the invention the carbon nanostructure networks or CNT networks may be distinguished from CNTs unorganized and not chemically linked to one another by a (second) transition at a temperature higher than 160° C., preferably higher than 175° C. The presence of that second transition state is indicative of the network rather than the individual tubes. An example is shown in FIG. 9c.

The invention also pertains to a composite composition comprising carbon nanotube networks according to the invention, further comprising a polymer, for instance for adding mechanical strength to said polymer-based composite. It may thus be added in any amount, e.g. 0.1-10 wt %, more preferably 0.5-8 wt %, even more preferably at least 1 wt %, based on the total polymer weight in the composite.

The invention also pertains to a bicontinuous micro-emulsion containing metal nanoparticles having an average particle size between 1 and 100 nm, wherein deviations in particle size from the average particle size are less than 10%, preferably less than 5%. The concentration of metal particles is preferably as described above, rendering the micro-emulsion suitable for providing crystalline nanostructures networks. The invention also pertains to the use of these bicontinuous micro-emulsions in manufacturing carbon nanostructures and networks thereof, as explained in detail here above.

EXAMPLES

Example 1

Carbon Nanotube Synthesis on Platinum Nanoparticles by CVD

Example 1a

Synthesis of Platinum Nanocatalysts

Two micro-emulsions were prepared after adding a mixture of a fluorocarbon surfactant [perfluoro(4-methyl-3,6-dioxaoctane)sulphonate] and n-hexanol to an aqueous solution. The first micro-emulsion contained the platinum precursor hexachloroplatinic acid. To the second micro-emulsion the reducing agent hydrazine was added. The amount of reducing agent was set at ten times the concentration of the platinum complex in order to obtain complete reduction upon mixing. The synthesis of nanoparticles was carried out by mixing equal amounts of the two micro-emulsions:

The platinum nanoparticles were characterized using transmission electron microscopy (TEM) and dynamic light scattering (DLS). Transmission electron microscopy (TEM) was accomplished using a Philips CM30T electron microscope with a lanthanum hexaboride (LaB6) filament operated at 300 kV as the source of electrons.

Figure 1B:
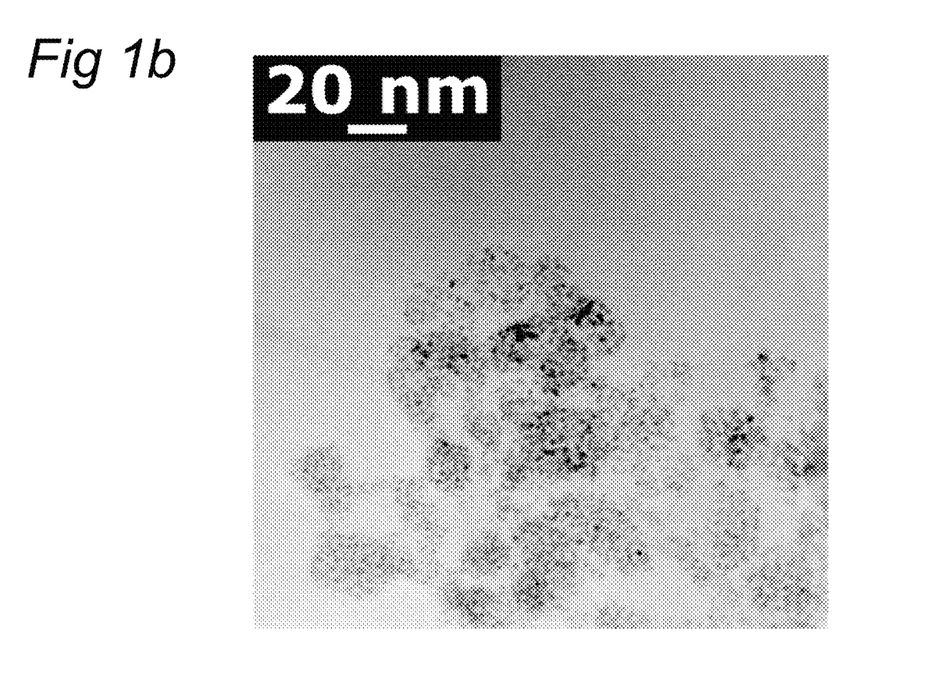
Figure 2:
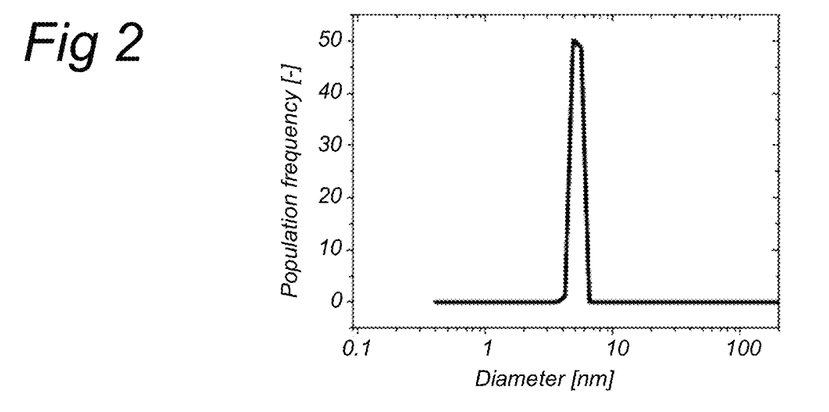
FIG. 2 shows the particle size distribution of the nanoparticles produced in a bicontinuous micro-emulsion measured by dynamic light scattering. This particular batch involves 5 nm particles corresponding to the recipe in example 1.

Samples were mounted on a Quantifoil® microgrid carbon polymer supported on a copper grid by dropping sample suspension on the grid. The particles showed an average particle size of about 5 nm, as shown in FIG. 1b and 2. The variations in size were analyzed being within 10% of the average size.

Comparative Example 1a.1

L2-Phase Micro-Emulsion

Figure 1A:
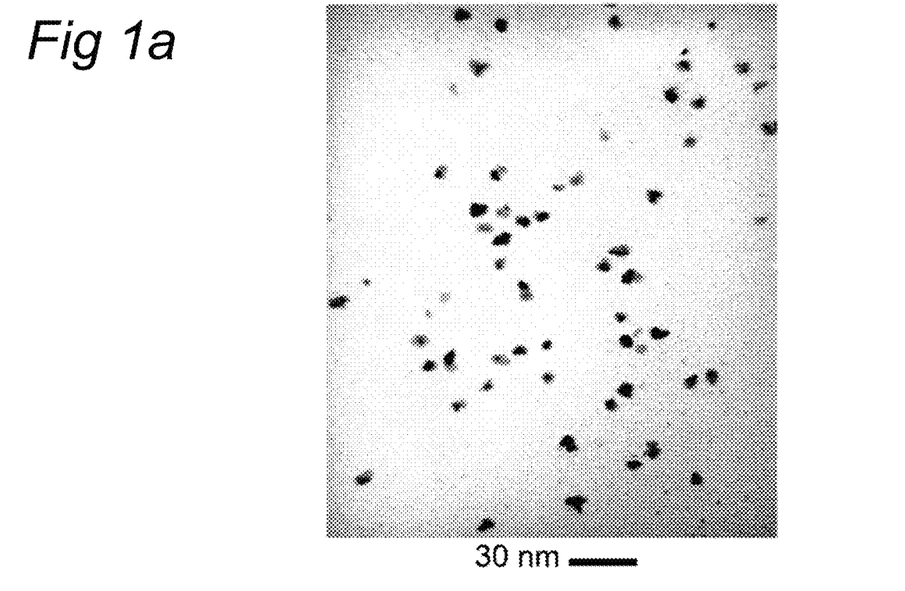
FIGS. 1a and 1b compare platinum nanoparticles produced using (a) droplet type micro-emulsion ('L2') and (b) bicontinuous micro-emulsion.

FIG. 1a shows an example of an L2-phase micro-emulsion. The figure is copied from D. -H. Chen, J. -J. Yeh and T. -C. Huang, J. Coll. Int. Sci., 215, (1999), 159-166. It stands model for the micro-emulsion applied in WO 81/02688. The nanoparticles in FIG. 1a that were generated in droplet type micro-emulsions were about 9 nm in size, and quite well separated from one another.

Clearly, the bicontinuous micro-emulsion shown in FIG. 1b has a higher density of uniformly sized and shaped nanoparticles than the L2-phase micro-emulsion of FIG. 1a. In the bicontinuous micro-emulsion the nanoparticles seem to be clustered in pools, which are connected by channels containing nanoparticles, possibly be the result of the motif of the bicontinuous structure, which is not visible as it has no contrast with the background. It is believed that the high density of catalyst nanoparticles result in the CVD process in a high degree of branching for the carbon nanotube networks therewith forming a chemically-linked network structure.

Example 1b

Synthesis of Carbon Nanotubes

The micro-emulsion containing 10 mM Pt precipitate was poured on a Copper grid, which was placed at the bottom of a reactor. After increasing the temperature to 973K (10 K/min) under a flow of nitrogen at 100 ml/min, ethylene gas ($C_2H_4$) was introduced at 10 ml/min into the reactor. The gas mixture passed through the reactor over the nanoparticles for 30 minutes at a constant temperature of 973K. Once the dwell step was over, the synthesis gas flow was stopped, and the reactor was cooled down to room temperature under nitrogen flow at 100 ml/min.

Figure 11A:
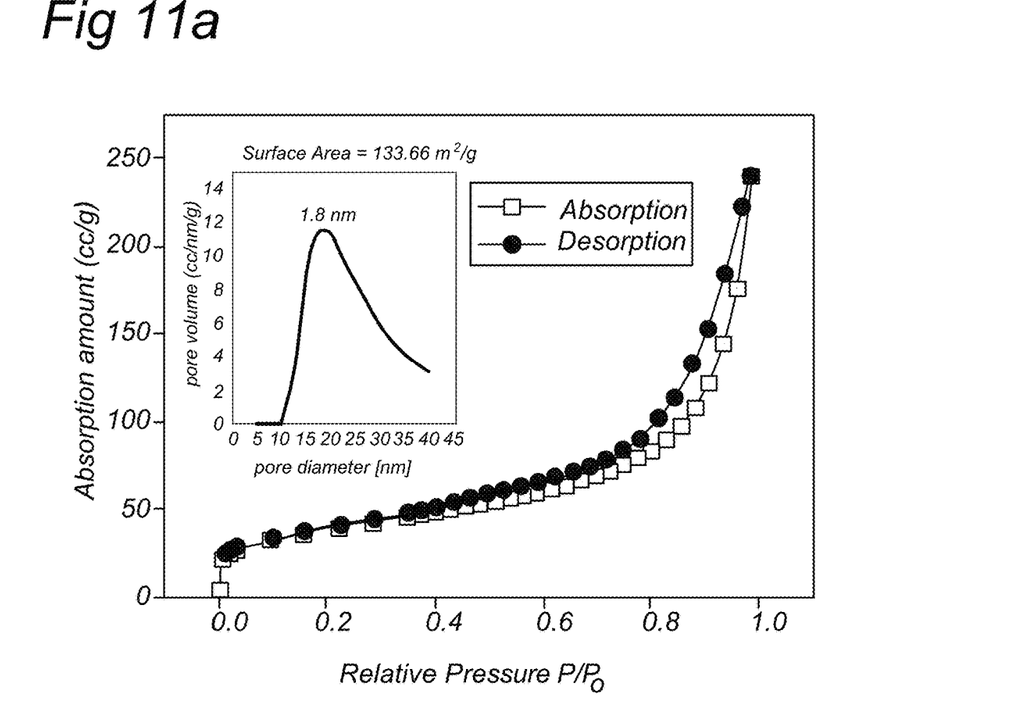
FIGS. 11a and 11b compares the porosity of (a) multi-walled carbon nanotubes and (b) CNT networks.
Figure 11B:
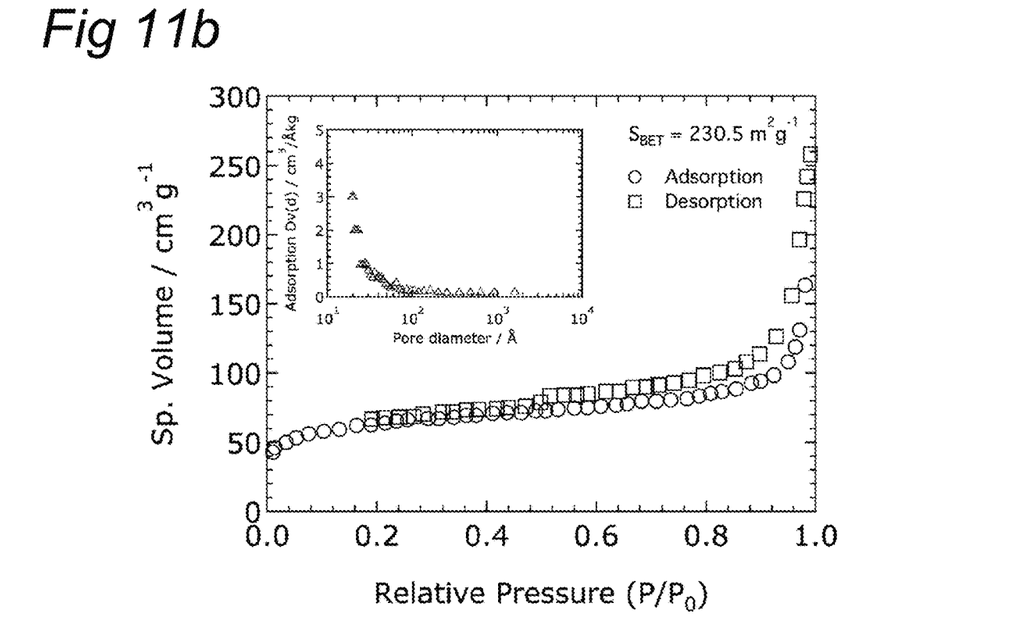

The carbon nanotubes thus obtained were characterized using electron microscopy (FIGS. 3a-8b), energy dispersive x-ray spectroscopy, dielectric spectroscopy (FIG. 9a), mechanical spectroscopy (FIG. 9b), Raman spectroscopy (FIGS. 10a and 10b) and nitrogen sorption (FIGS. 11a and 11b).

The tubes could be tuned to have a diameter from 5 to 50 nm and lengths from 100 nm to 3 microns. Each experiment resulted in nanotubes uniform in length and diameter as observed under electron microscopy (FIGS. 3a and 3b). The variations were 18% in diameter, and 7% in length.

Example 2

Carbon Nanotube Network

Figure 6A:
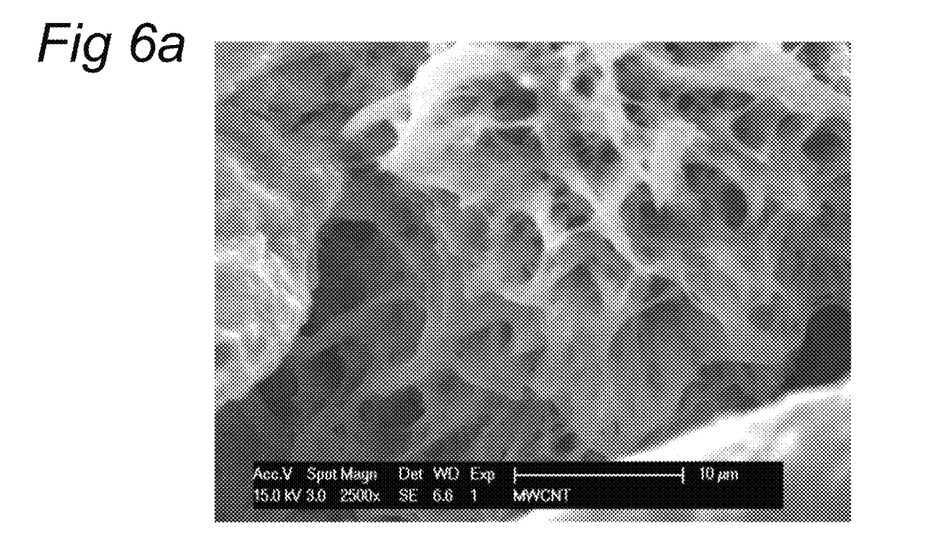
FIG. 6a shows a 'sponge-like' chemically linked CNT network according to the invention.
Figure 6B:
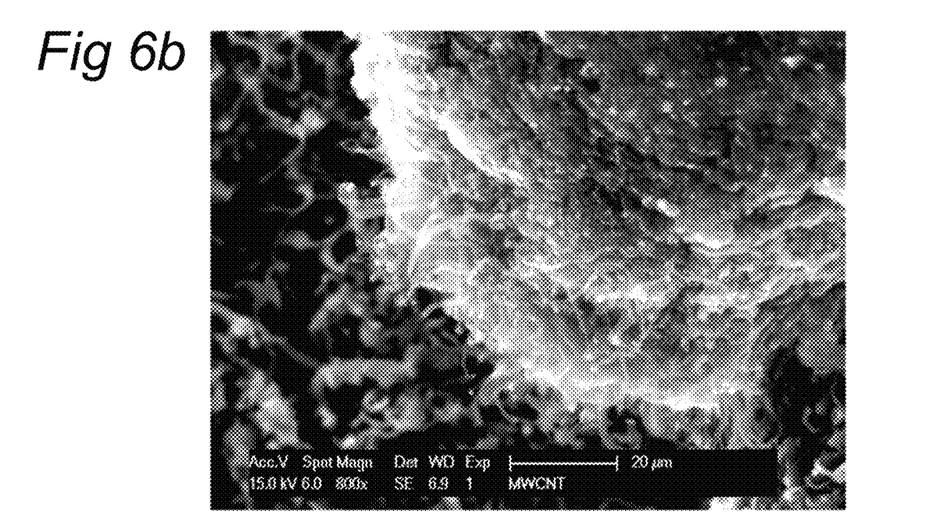
FIG. 6b illustrates typical, commercially available CNTs unorganized in clumps.
Figure 7A:
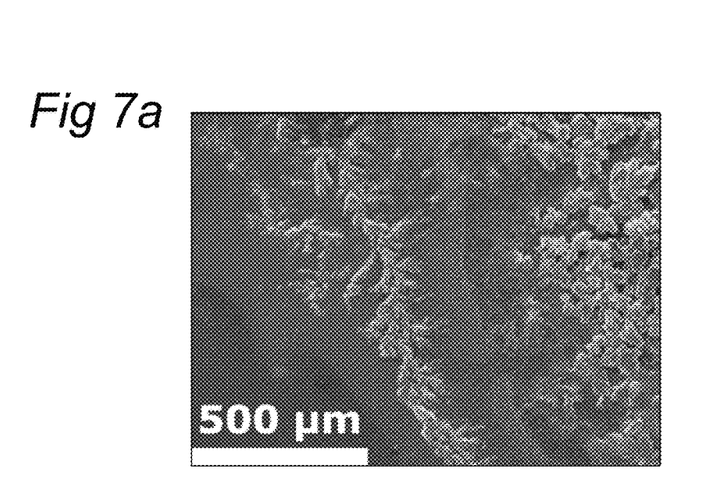
FIGS. 7a, 7b, 7c and 7d: CNT networks that have chemically linked CNTs according to the invention show new types of junctions.
Figure 7B:
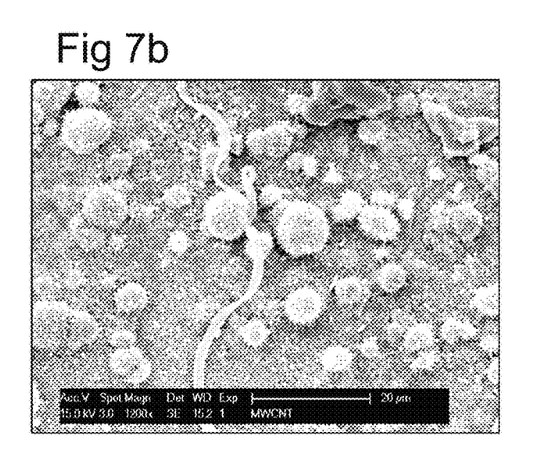
Figure 7C:
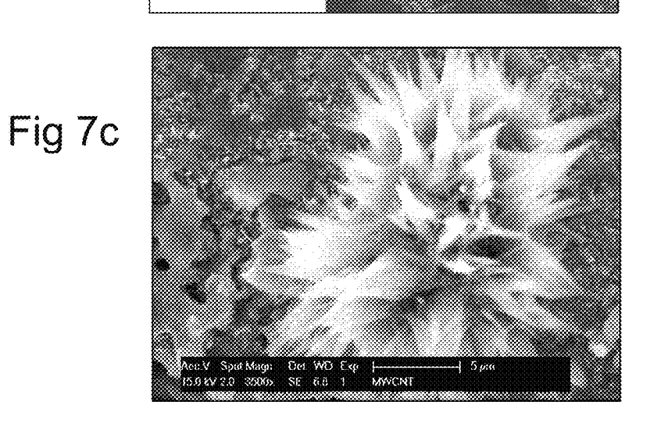
Figure 7D:
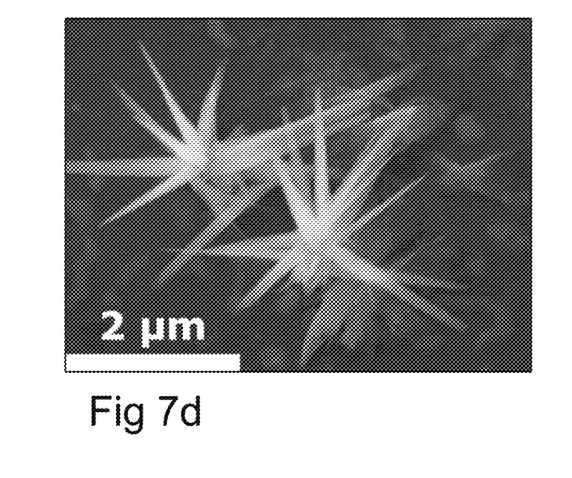

Example 1 was repeated, with the difference that a high catalyst concentration of 100 mM was used. The resulting nanotube networks were characterized by the same techniques as mentioned in example 1. The networks had dimensions from 50 µm to 1 mm (FIGS. 6a and 6b).

Example 3

Absorption Spectroscopy

Raman spectroscopy was performed on the nanotubes network according to the invention using a Renishaw Raman Imaging Microscope, system 2000, with a 20 mW Ar laser (514 nm). The Ramascope was calibrated using a silicon wafer. The results were compared with those obtained from a graph for carbon nanotubes was obtained from: F. Inoue, A. R. Ando and P. Corio, J. Raman Spectrosc., 42, (2011), 1379-1383.

The Raman absorption spectrum of multi-walled carbon nanotubes and carbon nanotube networks is shown in FIGS. 10a and 10b. The $I_D/I_G$ for carbon nanotubes is 0.92 which is higher than that of nanotube networks, this is probably due to more defects during the production of the nanotubes. The 2D band is broader for nanotube networks, which implies multiple layers or walls.

Example 4

Nitrogen Sorption

A Quantachrome Autosorb-1c instrument was used for nitrogen adsorption experiments carried out on on the nanotubes network according to the invention. All samples were outgassed at 350° C. for 17 hours in vacuum. The results were compared with those obtained from a graph for carbon nanotubes obtained from: M. Chen, H. -W. Yu, J. -H. Chen and H. -S. Koo, Diamond & Related Materials, 16, (2007), 1110-1115.

The specific surface area obtained by nitrogen sorption on multi-walled carbon nanotubes and carbon nanotube networks as shown in FIGS. 11a and 11b, proves the nanotube networks to be more active. The mean pore sizes of nanotubes and nanotube networks are comparable, however the networks have a broad distribution owing to inter-particulate voids.

Example 5

Mechanical Strength

A clear difference between carbon nanotubes and carbon nanotube networks is observed when added to other materials. In composite with polyimides (PI) the nanotube networks impart more mechanical stiffness on an average than carbon nanotubes as shown in FIG. 9b. The graph for carbon nanotubes was obtained from: X. Jiang, Y. Bin and M. Matsuo, Polymer, 46, (2005), 7418-7424.

In the case of ultra-high molecular weight polyethylene the carbon nanotube networks imparted strength that not only resulted in a longer plateau in the storage modulus after the first transition at 150° C. but also gave a new transition at 190° C., which further yielded to a longer plateau afterwards. All is plotted in FIG. 9c.

Adding 2% by weight of carbon nanotube networks to epoxy polymer caused the strength to become almost three times better, which was maintained over a broad thermal range between 50 and 200° C.: FIG. 9d.

A Pyris Diamond DMTA from Perkin Elmer Incorporated was used for the dynamic mechanical analysis. Three different frequencies of 0.1, 1 and 10 Hz were probed for each sample in the bending mode.

Example 6

Electrical Properties

Figure 9A:
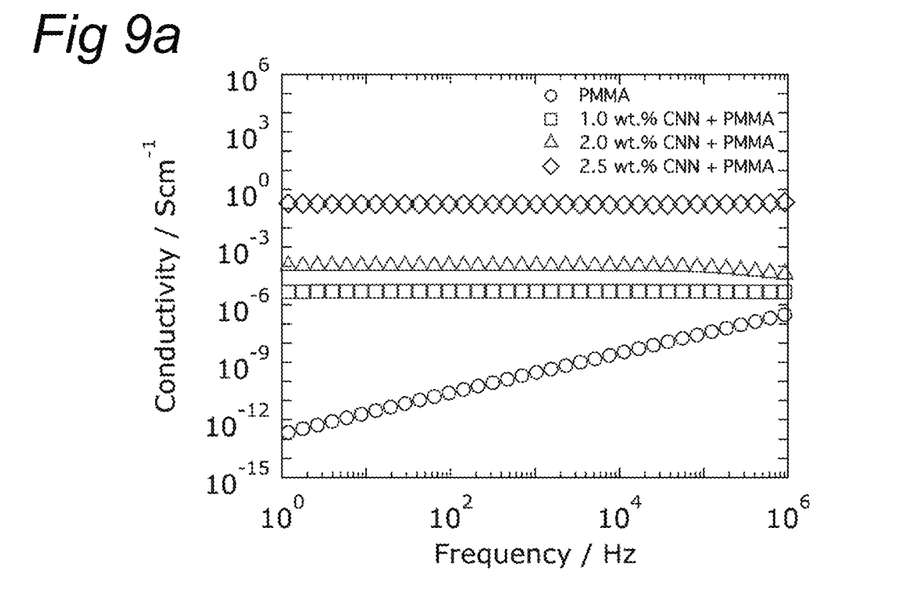
FIGS. 9a, 9b, 9c and 9d: (a) electrical conductivities of polymethylmethacrylate and composite comprising CNT networks and PMMA; (b) storage modulus of polyimide and composite comprising CNT networks and PI polyimides; (c) storage modulus and tan delta of polyethylene and composite comprising CNT networks and PE; and (d) storage modulus and tan delta of epoxy and composite comprising CNT networks and epoxy.
Figure 9B:
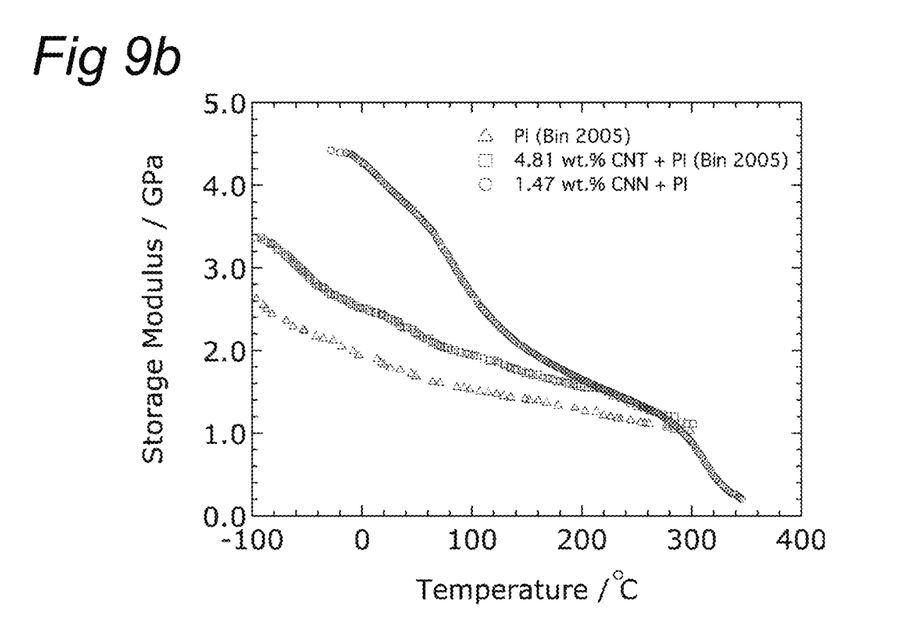
Figure 9C:
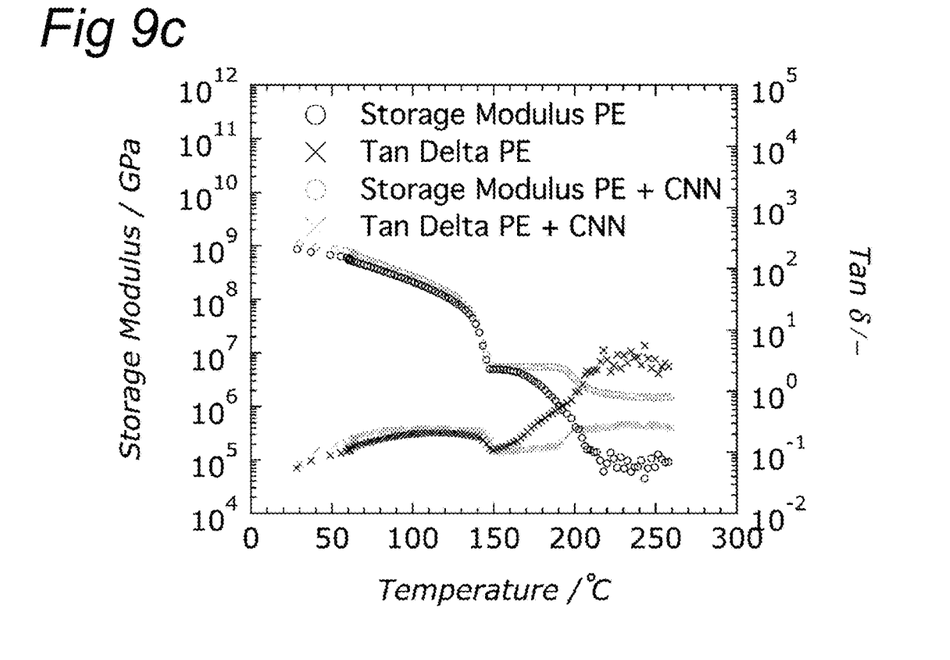
Figure 9D:
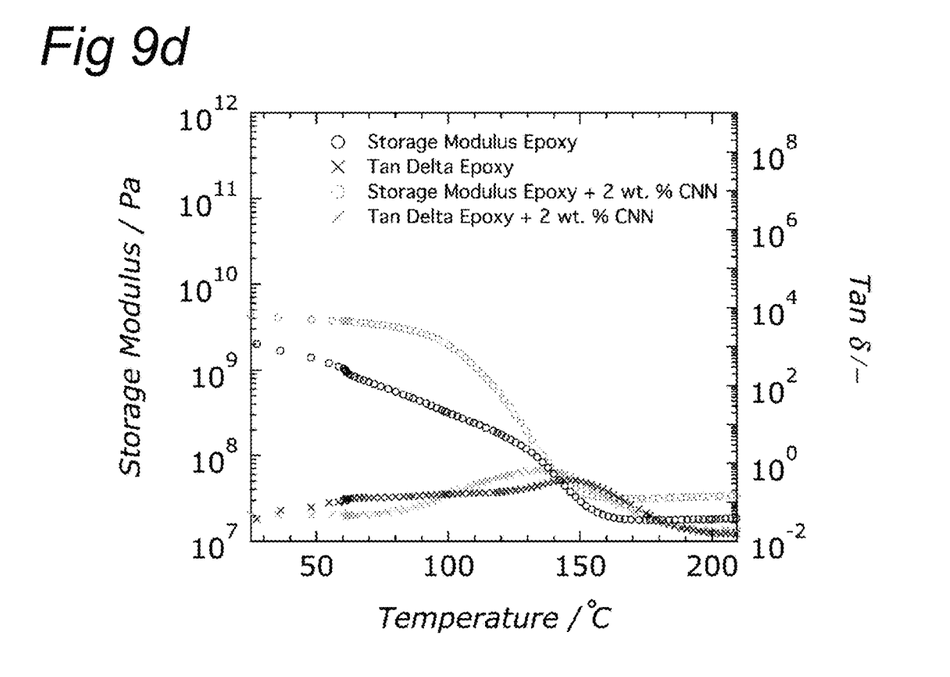

The electrical conductivity of polymethylmethacrylate (PMMA) composites with carbon nanotube networks as shown in FIG. 9a shows that it is independent of frequency regardless of the concentration, which is an indication of percolation. This behaviour is not seen in the pure or neat PMMA. In literature: D. O. Kim et al, Organic Electronics, 9, (2008), 1-13, it is found that 3 wt. % carbon nanotubes composited PMMA has a conductivity of 0.01 Scm$^{-1}$ which is two orders of magnitude lower than for nanotube networks composited PMMA.

A broadband dielectric spectrometer from Novocontrol GmbH equipped with a HP 4284A precision LCR meter was used to perform the dielectric analysis. The maximum applied voltage was 0.9 V.

Example 7

Thermal Properties

When mixed with silicone polymer in 2 wt. % CNT networks enhanced the thermal conductivity from 0.64 to 0.7 Wm$^{-1}$K$^{-1}$ at 298 K.

The Isomet model 104 from Isomet Corporation was used to determine the thermal conductivity. All samples were placed on a thermally insulating mat during measurement. The conductivities reported are an average value of the top and bottom surface of the samples.

Example 8

Catalytic Properties

Figure 12:
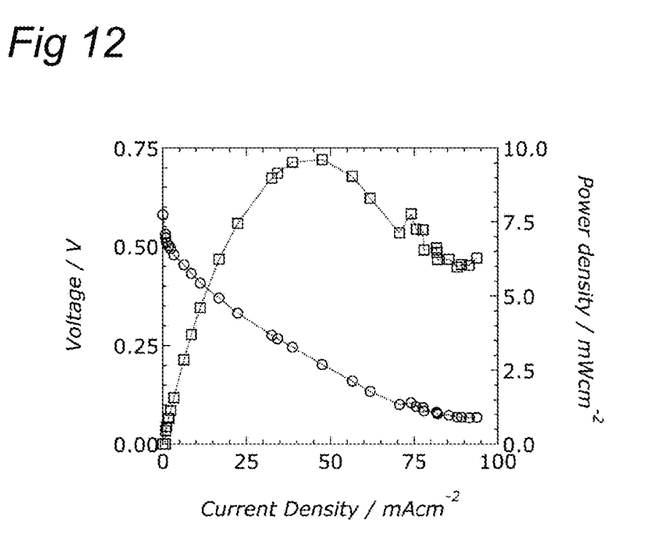
FIG. 12: Polarisation curve of the fuel cell constructed with carbon nanotube networks as the electrode and Nafion® as the electrolyte.

Carbon nanotube networks based electrodes gave a peak power output of 10 mWcm$^{-2}$ using hydrogen and oxygen as the fuel and oxidant respectively. A power curve is shown in FIG. 12.

An electrode area of 7 cm$^2$ was used. The H$_2$:O$_2$ pressure ratios were 1.5:1 and the flow rates of both gases were 50 ml/min. A Nafion® 117 membrane was used as the electrolyte.

Example 9

Other Metals

Different types of surfactant, oil and metal precursor that will be combined to create a bicontinuous micro-emulsion will lead to different values for the minimum concentration of catalyst particles required to form carbon nanotubes networks.

In the table here below a list of various bicontinuous micro-emulsions incorporating various concentrations of metal particles are listed; in each and every case a carbon nanostructures network was obtained.

| Catalyst | Surfactant | Oil | Reaction Temperature | Catalyst Support |
|---|---|---|---|---|
| Pt (20 mM) | AOT | n-heptane | 973 K | Titanium |
| Pt (750 mM) | AOT | n-dodecane | 973 K | Diamond |
| Pt (50 mM) | Fluorosurfactant | Hexanol | 973 K | Stainless steel |
| Pt (50 mM) | Fluorosurfactant | Hexanol | 873 K | Molybdenum |
| Au (20 mM) | AOT | n-heptane | 973 K | Titanium |
| Au (40 mM) | Fluorosurfactant | Hexanol | 973 K | Molybdenum |
| Ag (50 mM) | AOT | n-heptane | 923 K | Stainless Steel |
| Cu (25 mM) | AOT | n-heptane | 973 K | Titanium |
| Cu (50 mM) | Fluorosurfactant | Hexanol | 873 K | Stainless Steel |
| Fe (100 mM) | AOT | n-heptane | 973 K | Ceramic |
| Co (50 mM) | AOT | n-heptane | 973 K | Quartz |
| Pt (10 mM) + Ni (10 mM) | AOT | n-heptane | 973 K | Ceramic |

The presented catalyst concentrations are relative to the amount of the aqueous phase in the micro-emulsion.

Figure 8A:
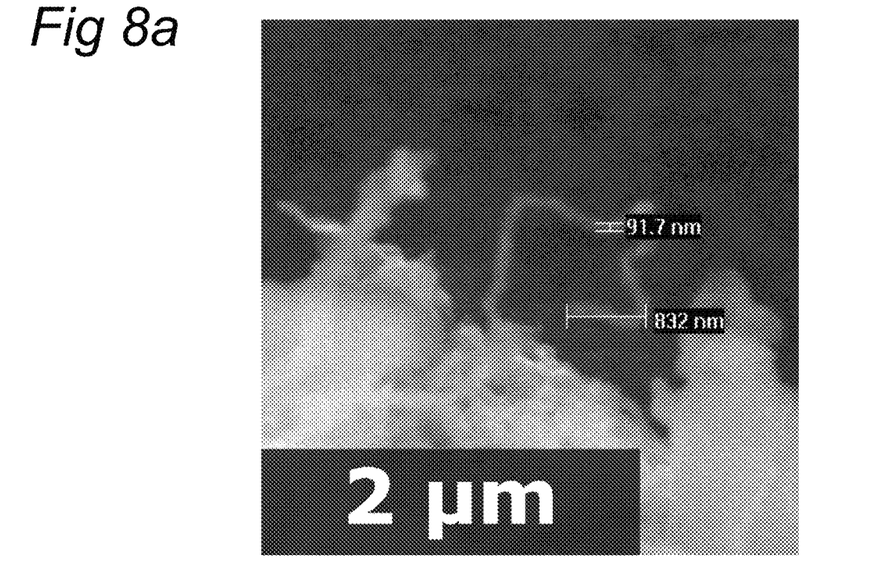
FIGS. 8a and 8b show carbon nanotube networks grown using (a) iron and (b) silver catalyst nanoparticles.
Figure 8B:
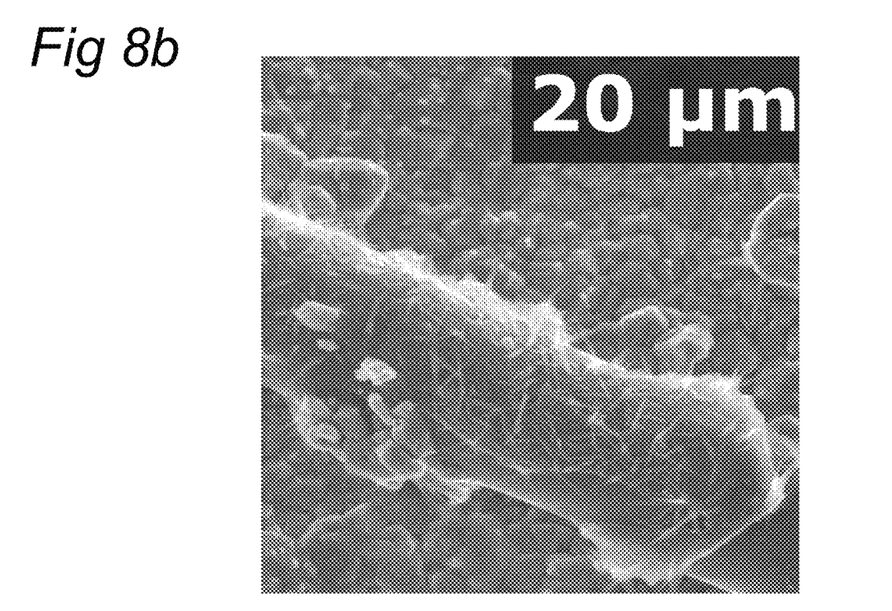

Using the method according to the invention, carbon nanotube networks were obtained independent of the catalyst material in the bicontinuous micro-emulsion. However, the type of catalyst material may have an effect on the morphology of the carbon nanotube networks. For instance, iron catalyst nanoparticles yield more bundled nanotube networks whose branches are undulating as seen in FIG. 8a whereas silver catalyst nanoparticles yield more linear and thicker branches (FIG. 8b).

The invention claimed is:

1. A network of chemically or covalently interconnected crystalline carbon nanotubes in which metal nanoparticles are embedded inside and physically attached to the carbon nanotubes, characterized by a Raman spectrum which consists of two partly overlapping but distinct signals in the wavelength region of 1000-2000 $cm^{-1}$, and a third signal in the wavelength region of 1800-3500 $cm^{-1}$ having a signal width at half-height of at least 300 $cm^{-1}$.

2. The network according to claim 1, wherein the signals are identified by having a signal-to-noise ratio of at least 10.

3. The network according to claim 2, wherein the signals are identified by having a signal-to-noise ratio of at least 20.

4. The network according to claim 1, wherein the third signal has a signal width at half-height of 300-800 $cm^{-1}$.

5. The network according to claim 1, wherein the third signal has a signal width at half-height up to 1000 $cm^{-1}$.

6. A composite composition comprising a carbon nanostructure network according to claim 1 and a polymer.

7. The composite composition according to claim 6, comprising the network in an amount of 0.1-10 wt%, based on total polymer weight in the composite composition.

8. The composite composition according to claim 6, wherein the polymer is an epoxy polymer or a silicone polymer.

* * * * *